United States Patent Office 3,639,376
Patented Feb. 1, 1972

3,639,376
POLYOLEFIN CRYSTALLIZATION ADDITIVES
William G. De Pierri, Jr., and Hulen L. Wilder, Baytown, Tex., assignors to Esso Research and Engineering Company
No Drawing. Filed July 24, 1968, Ser. No. 747,108
Int. Cl. C08d 3/04; C08f 3/08, 3/02
U.S. Cl. 260—93.7          7 Claims

ABSTRACT OF THE DISCLOSURE

The rate and temperature of crystallization of crystallizable polyolefins is increased by including therein nucleating amounts of esters, polyesters having molecular weights of up to the order of 2000, or mixtures thereof, all structurally derived from certain mono-, di-, and tri-hydric alcohols and polycarboxylic acids having two carboxyl groups separated by a chain of less than 6 carbon atoms.

BACKGROUND OF THE INVENTION

Field of the invention

The present invention is directed to crystallizable polyolefin compositions having improved physical properties. More particularly, it relates to esters and polyesters having molecular weights of up to about 2000 that are structurally derived from di- and tri-carboxylic acids and mono-, di-, and tri-hydric alcohols. Specifically, it concerns the use of these esters and polyesters as nucleating agents to increase the rate and temperature of crystallization of crystallizable polyolefins from the molten to the solid state.

Description of the prior art

Heretofore it has been known that certain materials of appropriate size and properties, including inorganic materials such as talc, and organic acids such as phthalic, succinic, adipic acid, their anhydrides and certain metal salts thereof, when present in molten crystalline polyolefins, act as nuclei about which crystallites cluster to form spherulites as the molten polyolefin cools past its melting point. Crystalline polypropylene which is nucleated in this manner exhibits improved physical properties, such as increased stiffness, increased tensile strength, increased crystallinity under normal processing conditions, and in many cases, increased clarity.

However, such nucleating agents have not been entirely satisfactory in producing the desired results. The organic materials which are presently known are too volatile and subject to excessive loss at the relatively high temperatures of polymer fabrication. This is particularly important in monofilament manufacture, for the extruded filaments have large surface areas from which substantial amounts of organic acids or anhydrides employed as nucleating agents may vaporize. Some acidic nucleating agents cannot be used in combination with general purpose stabilizer systems incorporated in polyolefin resins. The metal salts of some organic acids are usually but slightly soluble, and consequently, only difficultly dispersible in polypropylene, and nonuniform crystallization often results. The inorganic materials, such as talc, not only are difficult to disperse, but decrease the clarity of the polymer in which they are incorporated.

Specific prior art considered in connection herewith includes:

| | |
|---|---|
| U.S. Pat. 3,157,614 | U.S. Pat. 3,207,739 |
| U.S. Pat. 3,207,735 | U.S. Pat. 3,268,499 |
| U.S. Pat. 3,207,736 | U.S. Pat. 3,327,020 |
| U.S. Pat. 3,207,737 | U.S. Pat. 3,327,021 |
| U.S. Pat. 3,207,738 | |

SUMMARY OF THE INVENTION

The foregoing problems of the prior art are overcome by the present invention, which involves a composition comprised of a crystallizable polyolefin containing a minor but effective nucleating amount of esters, or polyesters having a molecular weight of up to about 2000, or mixtures thereof, which are structurally derived from polycarboxylic acids having two carboxyl groups separated by a chain of less than 6 carbon atoms and alcohols selected from monohydric aliphatic alcohols of from about 4 to about 20 carbon atoms, aliphatic glycols of from about 2 to 18 carbon atoms, polyethylene glycols, alkyl ethers of polyethylene glycols, dihydric alicyclic alcohols having a 6-membered ring, and trihydric aliphatic alcohols of about 3 carbon atoms.

In a particular embodiment, about 1–3 mols of dicarboxylic acids having carboxyl groups separated by a chain of at least 6 carbon atoms are esterified with about 1–2 mols of the foregoing alcohols and the ester or polyester product is admixed in nucleating amounts with a crystallizable polyolefin, the resulting mixture is melted, and the melt is cooled to cause it to solidify into shaped articles.

The composition is easily processed because the esters, and particularly the polyesters, are homogeneous with the polyolefin containing them and are easily and uniformly dispersible therein. Since the molecular weights of the esters and polyesters are substantially higher than that of their precursor acids or acid derivatives, less nucleating additive is volatilized during high temperature fabrications. In addition, many of the present additives contain no free acid groups to compromise general purpose stabilizer systems which may be contained in the polyolefin.

DESCRIPTION OF THE PREFERRED EMBODIMENT

A more complete understanding of the present invention and a fuller appreciation of its advantages may be gained from the following description of the preferred modes.

In accordance with the present invention, esters, or polyesters having a molecular weight of up to about 2000, or mixtures thereof, which are structurally derived from polycarboxylic acids having two carboxyl groups separated by a chain of less than 6 carbon atoms and certain mono-, di-, and tri-hydric alcohols, are incorporated in minor but effective amounts in a crystallizable polyolefin to serve as nucleating agents, providing thereby improved rates of polyolefin crystallization from a liquid to a solid phase and increasing the temperatures at which crystallization is complete.

As used herein, the term "polyolefin" means a normally solid crystalline hydrocarbon polymer produced by the well-known high pressure, low pressure, or Ziegler-type polymerization processes from such alpha-olefins as ethylene, propylene, isobutene, 1-butene, 3-methyl-1-butene, 4-methyl-1-pentene, other higher homologs thereof; diolefins such as 1,4-butadiene, etc.; and hydrocarbon polymers such as polystyrene, etc.; said polymer being a homopolymer or a blend of homopolymers (e.g., polyethylene and polypropylene, or polypropylene and polyisobutene), a copolymer of one of the indicated alpha-olefins with another such alpha-olefin or with a polymerizable olefinic monomer such as styrene, 1,4-butadiene or the like, whether random, block, or graft copolymer, such hydrocarbon polymers having molecular weights in the general range of 50,000 to 2,000,000.

The esters and polyesters added to polyolefins to effect nucleation are structurally derived in part from polycarboxylic acids having two carboxyl groups separated by a chain of less than 6 carbon atoms. Examples of these acids are such aliphatic dicarboxylic acids as oxalic, malonic, succinic, glutaric, adipic, pimelic, maleic, or fumaric acids, such mononuclear aromatic dicarboxylic acids as phthalic acid, and such mononuclear tricarboxylic acids as trimellitic acid. These carboxylic acids are characterized by the common property of having an acid strength, as measured by the first acid dissociation constant, that is higher than the acid dissociation constant of aectic acid ($K_a = 1.5 \times 10^{-5}$). Generally speaking, the melting point of the acids of the group is greater than about 100° C. but less than about 300° C. For example, glutaric acid melts at about 98° C. and trimellitic acid melts at about 238° C.

It has been found that alcohols which may be used with dicarboxylic acids, as above characterized, to derive the esters and polyesters of this invention, are monohydric aliphatic alcohols of about 4 to about 20 carbon atoms, aliphatic glycols of about 2 to about 18 carbon atoms, polyethylene glycols, alkyl ethers of polyethylene glycols, dihydric alicyclic alcohols having a 6-membered ring, and trihydric aliphatic alcohols of about 3 carbon atoms. These esters and polyesters are derived by esterifying about 1-2 mols of these alochols with about 1-3 mols of the present dicarboxylic acids.

Alcohols comprising a group for deriving the present esters and polyesters with a tricarboxylic mononuclear aromatic acid are aliphatic glycols of from about 2 to about 20 carbon atoms, alkyl ethers of polyethylene glycols, and trihydric aliphatic alcohols of about 3 carbon atoms. About 1-3 mols of the tricarboxylic mononuclear aromatic acid are esterified with about 1 mol of an alcohol of this group to provide such nucleating agents.

Suitable monohydric aliphatic alcohols of from 4 to 20 carbon atoms accordingly range from butyl alcohols boiling above about 100° C., for example, butyl alcohol, to higher aliphatic alcohols, including octanol and octadecanol. Exemplary of aliphatic glycols of from about 2 to 18 carbon atoms are 1,2-glycols such as 1,2-ethanediol (ethylene glycol), 1,2-propanediol (propylene glycol); 1,3-glycols such as 2,2-dimethyl-1,3-propanediol; 1,4-glycols, for example, 1,4-butanediol (tetramethylene glycol); and higher glycols, such as 1,10-glycols, for example, 1,10-decanediol; and higher homologs up to about 20 carbon atoms.

Exemplary polyethylene glycols include diethylene glycol and triethylene glycol. Alkyl ethers thereof include, for example, the monoethyl ether of diethylene glycol. Suitable dihydric alicyclic alcohols having a 6-membered ring include 1,4-dimethanolcyclohexane. A suitable trihydric aliphatic alcohol of about 3 carbon atoms is glycerol.

The esters of the present invention comprise half-esters structurally derived from 1 mol of an above-described alcohol having 1-3 hydroxy groups and a number of mols of a present polycarboxylic acid about equal to the number of hydroxyl groups of such alcohol; half-esters structurally derived from 1 mol of a polycarboxylic acid above described and 1 mol of a present alcohol; and "complete" di-esters structurally derived from 1 mole of a polycarboxylic acid hereof having 2-3 carboxyl groups and a number of mols of an alcohol above described which is about equal to the number of the carboxyl groups of such acid. Of these embodiments, the first-mentioned "half-ester" is preferred. However, the term "ester" is used as inclusive of all the above variants.

The polyesters of this invention have molecular weights of up to on the order of 2000, but desirably about 1000, and are structurally derived from approximately equimolar amounts of the present polycarboxylic acids and alcohols, said polyesters having repeating ester-linked groups sufficient to produce the aforesaid molecular weights.

The term "structurally derived" is used in recognition of the fact that the present esters and polyesters may be prepared by several methods well known to chemists, for example, by reacting one of the present polycarboxylic acids in alcohol in the presence of an acid catalyst such as boron trifluoride; by heating the acid anhydride of one of the present polycarboxylic acids with one of the present alcohols; by reacting an acid chloride of a present polycarboxylic acid with one of the instant alcohols; by reacting carboxylate salts of the present polycarboxylic acid with either an alkyl chlorosulfite derived from an alkyl alcohol reacted with a thionyl chloride, or with alkyl halides; or by other familiar methods. Preferably, however, the esters and polyesters of this invention are prepared from anhydrides of the present acids and the present alcohols because of the thermodynamic ease with which this reaction occurs, the relative inexpense of the reactants, and most importantly, the fact that the reaction substantially goes to completion without establishing equilibrium between product and precursor. Also, the anhydride reaction, when selected molar ratios of anhydride and alcohol are combined, produces better yields of half-esters, a preferred form of ester. The words "structurally derived" from polycarboxylic acids . . . and alcohols are used herein to make it clear that it is the esters and polyesters that are involved in the present invention, and not the method of making them.

Blends of the present nucleating agents with crystallizable polyolefins can be prepared by any suitable manner, for example, by mechanically mixing or other blending methods. Minor but effective nucleating amounts of the esters, polyesters, or mixtures thereof, are employed in the blend. In general, amounts of from about 0.01-2% by weight, preferably from 0.05-2% by weight, based on the polymer in the blend, are utilized.

It is entirely adequate to mix the nucleating agents in the dry state with the crystallizable polyolefin in the crystallized state by making up a master batch with a Banbury mixer, mixing the master batch with the base polyolefin resin, and then extruding the resulting mixture in a homogenizing extruder. The resultant mixture may be formed into selected articles such as filaments, ribbons, or the like, or injection-molded into forms of whatever shape is desired for a particular application.

Further details of the practice of the present invention are set forth in the following examples, which are intended to illustrate particular embodiments of the present invention without limitation on the scope thereof. In the examples, all percentages are by weight of the polyolefin unless otherwise indicated.

EXAMPLES 1–16

Phthalic anhydride was melted under a nitrogen blanket and reacted with various mono- and poly-(di-, and tri-)-hydric alcohols at a temperature below the boiling point of the particular reactants for a time effective to complete the reaction, based on the rate of esterification of the anhydride, or, in some instances, for a time sufficient to allow esterification of the second acid group. The reactions were not significantly pressure-dependent and were carried out at atmospheric pressures. On completion of the reaction, the unreacted material was removed by evaporation under a vacuum, and the product was isolated by filtration and further dried for several hours in a vacuum oven to strip any residual acid anhydride.

Microscopic slides were prepared from blends of 0.25 or 1.0 weight percent of ester in crystalline polypropylene which were melted at 200° C., the crystals of which were allowed to grow for an hour at 130° C. in an aluminum oven. The slides of blended polymer were then examined under a polarizing microscope for evidence of the presence of a nucleating agent. The nucleation ability of the ester was rated according to the quality and uniformity of crystals produced.

Some of the polymer samples were ground and tumble blended with additional polymer to provide a sample of sufficient size for injection molding. Additional polymer was added so that injection-molded samples contained 0.10 weight percent of nucleating additive. In some instances, injection-molded pads were checked for clarity against a polypropylene pad containing no additive. In other instances, stiffness was tested according to ASTM D 747–63. The melt flow rate of the polypropylene was 9.9, as determined by ASTM D 1238–62T. It had 95.2 percent heptane insolubles. The results of these measurements and determinations are disclosed in Table I.

TABLE I

| Example | Alcohol | Mol[a] ratio | Nucleation | Stiffness (×10⁻³) | Clarity[b] |
|---|---|---|---|---|---|
| Control A[c] | | | | 114.3 | 4 |
| Control B[d] | | | Excellent | 142.7 | 1 |
| 3 | Glycerol | 0.5 | Good | | |
| 4 | do | 1.0 | do | | |
| 5 | Triethylene glycol | 1.0 | do | | |
| 6 | 1,10-decanediol | 0.5 | do | | |
| 7 | do | 2.0 | | 127.9 | |
| 8 | 1,4-dimethanol cyclohexane | 0.5 | do | | |
| 9 | do | 2.0 | | 127.2 | |
| 10 | 1,4-butanediol | 2.0 | | 127.4 | |
| 11 | 2,2-dimethyl-1,3-propanediol | 2.0 | | 127.2 | |
| 12 | Octanol | 1.0 | | 145.4 | |
| 13 | Octadecanol | 1.0 | | 136.2 | |
| 14 | Ethylene glycol | 2.0 | | | 1 |
| 15 | Monoethylether of diethylene glycol | 1.0 | | | 1 |
| 16 | Diethylene glycol | 2.0 | | | 2 |

[a] Acid to alcohol.
[b] 1=Excellent; 2=Good; 3=Improved; 4=Poor.
[c] Propylene with no nucleating additives.
[d] Propylene nucleated with 0.1% phthalic anhydride.

The results of the tests indicate that esters derived from phthalic acid and mono-, di-, and tri-hydric alcohols performed well as nucleating agents, increasing the strength and clarity of molded polypropylene containing them over that of molded polypropylene absent them. Indeed, the results show that these nucleating agents provided strength and clarity comparable to that obtained with phthalic anhydride.

EXAMPLES 17–28

The preparation and testing of esters was carried out in identical fashion as in Examples 1–16, except that the anhydrides of succinic, glutaric, and maleic acids were used instead of phthalic anhydrides. The results are shown Table II.

TABLE II

| Example | Acid | Alcohol | Mol[a] ratio | Nucleation | Stiffness (×10⁻³) | Clarity[b] |
|---|---|---|---|---|---|---|
| Control A[c] | | | | | 114.3 | 4 |
| Control B[d] | | | | Excellent | 142.7 | 1 |
| 17 | S[e] | Triethylene glycol | 1 | do | | |
| 18 | S[e] | 1,4-butanediol | 2 | | 126.3 | |
| 19 | S[e] | 1,10-decanediol | 2 | | 115 | |
| 20 | S[e] | 1,4-dimethanol-cyclohexane | 2 | | 132.2 | |
| 21 | S[e] | Glycerol | 3 | | | 3 |
| 22 | S[e] | Ethylene glycol | 2 | | | 3 |
| 23 | S[e] | Diethylene glycol | 2 | | | 1 |
| 24 | G[f] | Ethylene glycol | 2 | | | 3 |
| 25 | G[f] | Glycerol | 3 | | | 3 |
| 26 | M[g] | Octanol | 1 | | 119.1 | |
| 27 | M[g] | Ethylene glycol | 2 | Excellent | | |
| 28 | M[g] | Glycerol | 3 | | | 3 |

[a]–[d] See footnotes at end of Table I.
[e] Succinic anhydride.
[f] Glutaric anhydride.
[g] Maleic anhydride.

Again the nucleated samples showed superior clarity and flexural strength compared to unnucleated samples.

EXAMPLES 29–31

Following the same methodology as previous examples, esters of trimellitic anhydrides were tested as shown in Table III.

TABLE III

| Example | Alcohol | Mol[a] ratio | Nucleation | Stiffness (×10⁻³) | Clarity[b] |
|---|---|---|---|---|---|
| Control A[c] | | | | 114.3 | 4 |
| Control B[d] | | | Excellent | 142.7 | 1 |
| 29 | Monoethylether of diethylene glycol | 1 | | | 3 |
| 30 | 1,10-decanediol | 2 | | 115.3 | |
| 31 | Glycerol | 3 | | | 3 |

[a]–[d] See footnotes at end of Table I.

The nucleated polypropylene samples are seen to have compared favorably to unnucleated polypropylene.

EXAMPLES 32–34

Polyesters having molecular weights of about 1000 were prepared from phthalic anhydride and 1,4-dimethanol cyclohexane, phthalic anhydride and diethylene glycol, and phthalic anhydride and propylene glycol by reacting sufficient mol quantities of phthalic anhydride and the particular reactant in xylenes solvent to provide the desired molecular weight, based on a materials balance after completion of the reaction. Observations and measurements were conducted as before. Respective stiffnesses ($\times 10^{-3}$) of 130.2, 128.5, and 122 were obtained for the polyesters of phthalic anhydride and 1,4-dimethanol cyclohexane, phthalic anhydride and diethylene glycol, and phthalic anhydride and propylene glycol. This was greater than the stiffness of an unnucleated polypropylene pad and compares well with a polypropylene specimen nucleated with phthalic anhydride.

EXAMPLES 35–39

Copolymers of 3.4% ethylene and 96.6% propylene having a melt flow rate of 11.5, as obtained with ASTM D 1238–62T, and a heptane insolubles content of 83.3 percent, were nucleated with esters derived from phthalic anhydride and, respectively, the monoethylether of diethylene glycol, diethylene glycol, and octanol. Tensile strength measurements and elongation notations were made according to ASTM D 638–64T, melt index, by ASTM D 1238–62T, and Izod notched and unnotched impact tests, by ASTM D 256–56. As before, stiffness was determined by ASTM D 747–63.

TABLE IV

| Example | Stiffness ($\times 10^{-3}$) | Tensile | Elongation | Izod Unnotched | | | Notched | Melt index |
|---|---|---|---|---|---|---|---|---|
| | | | | 0° C.[a] | −20° C.[b] | −40° C.[c] | | |
| Control C | 90.9 | 3,272 | 20.1 | 10.6 | 7.6 | 5.3 | 1.11 | 10.1 |
| Control D | 83.8 | 3,260 | 19.0 | 12.3 | 8.1 | 5.9 | 1.69 | |
| 37 | 97.2 | 2,387 | 17.1 | 12.8 | 7.8 | 6.5 | 1.70 | 8.8 |
| 38 | 89.9 | 3,831 | 20.0 | 12.7 | 5.7 | 5.2 | 1.88 | 10.6 |
| 39 | 100.0 | 3,737 | 20.0 | 16.6 | 7.7 | 5.9 | 1.45 | 12.2 |

[a] 8 lb. hammer.
[b] 4 lb. hammer.
[c] 2 lb. hammer.

As disclosed by Table IV, the presence of the present nucleating agents was comparable in result to, and even better in some instances than, phthalic anhydride.

Having fully described the best modes and embodiments of the present invention, it is to be understood that the present invention is not limited to the specific details set forth, but is of the full scope of the appended claims.

What is claimed is:

1. A composition comprising a crystallizable polyolefin, from an olefin having at least 3 carbon atoms, containing an effective nucleating amount of an ester structurally derived from:
   (a) polyhydric alcohols selected from the group consisting of aliphatic glycols of from about 2 to about 18 carbon atoms, alicyclic glycols having a six-membered ring, polyethylene glycols and glycerol, and
   (b) dicarboxylic and tricarboxylic acids having carboxyl groups separated by a carbon chain of less than 6 carbon atoms.

2. The composition of claim 1 wherein said ester is structurally derived from said alcohols and said acids at an acid-to-alcohol mol ratio of from 0.5 to 2 where said polyhydric alcohol is dihydric, and at a mol ratio from 0.5 to 3 where said polyhydric alcohol is glycerol.

3. A composition comprising a polypropylene containing an effective nucleating amount of an ester structurally derived from:
   (a) polyhydric alcohols selected from the group consisting of aliphatic glycols of from about 2 to about 18 carbon atoms, alicyclic glycols having a six-membered ring, polyethylene glycols and glycerol, and
   (b) dicarboxylic and tricarboxylic acids having carboxyl groups separated by a carbon chain of less than 6 carbon atoms.

4. A composition comprising a crystallizable polyolefin, from an olefin having at least 3 carbon atoms, containing an effective nucleating amount of an ester structurally derived from:
   (a) polyhydric alcohols selected from the group consisting of aliphatic glycols of from about 2 to about 18 carbon atoms, alicyclic glycols having a six-membered ring, polyethylene glycols and glycerol, and
   (b) dicarboxylic and tricarboxylic acids having carboxyl groups separated by a carbon chain of less than 6 carbon atoms, and selected from the group consisting essentially of aliphatic dicarboxylic acids, mononuclear dicarboxylic acids, and mononuclear tricarboxylic acids
at an acid-to-alcohol mol ratio of from 0.5 to 2 where said polyhydric alcohol is dihydric, and at a mol ratio from 0.5 to 3 where said polyhydric alcohol is glycerol.

5. A composition comprising a polypropylene polyolefin containing an effective nucleating amount of an ester structurally derived from:
   (a) polyhydric alcohols selected from the group consisting of aliphatic glycols of from about 2 to about 18 carbon atoms, alicyclic glycols having a six-membered ring, polyethylene glycols and glycerol, and
   (b) dicarboxylic and tricarboxylic acids having carboxyl groups separated by a carbon chain of less than 6 carbon atoms, and selected from the group consisting essentially of aliphatic dicarboxylic acids, mononuclear dicarboxylic acids, and mononuclear tricarboxylic acids
at an acid-to-alcohol mol ratio of from 0.5 to 2 where said polyhydric alcohol is dihydric, and at a mol ratio from 0.5 to 3 where said polyhydric alcohol is glycerol.

6. A composition comprising a crystallizable polyolefin, from an olefin having at least 3 carbon atoms, containing from about 0.05 to about 2.0 weight percent of an ester structurally derived from:
   (a) polyhydric alcohols selected from the group consisting of aliphatic glycols of from about 2 to about 18 carbon atoms, alicyclic glycols having a six-membered ring, polyethylene glycols and glycerol, and
   (b) dicarboxylic and tricarboxylic acids selected from the group consisting essentially of oxalic acid, malonic acid, succinic acid, glutaric acid, adipic acid, pimelic acid, maleic acid, fumaric acid, phthalic acid, and trimellitic acid
at an acid-to-alcohol mol ratio of from 1 to 2 where said polyhydric alcohol is dihydric, and at an acid-to-alcohol mol ratio from 1 to 3 where said polyhydric alcohol is glycerol.

7. A composition comprising a polypropylene containing from about 0.05 to about 2.0 weight percent of an ester structurally derived from:
  (a) polyhydric alcohols selected from the group consisting of aliphatic glycols of from about 2 to about 18 carbon atoms, alicyclic glycols having a six-membered ring, polyethylene glycols and glycerol, and
  (b) dicarboxylic and tricarboxylic acids selected from the group consisting essentially of oxalic acid, malonic acid, succinic acid, glutaric acid, adipic acid, pimelic acid, maleic acid, fumaric acid, phthalic acid, and trimellitic acid at an acid-to-alcohol mol ratio of from 1 to 2 where said polyhydric alcohol is dihydric, and at an acid-to-alcohol mol ratio from 1 to 3 where said polyhydric alcohol is glycerol.

References Cited
UNITED STATES PATENTS

| | | | |
|---|---|---|---|
| 2,991,264 | 7/1961 | Monroe et al. | 260—32.6 |
| 3,000,845 | 9/1961 | Doak et al. | 260—30.6 |
| 3,367,926 | 2/1968 | Volks | 260—94.9 X |
| 3,299,176 | 1/1967 | Longworth | 260—876 |

JOSEPH L. SHOFER, Primary Examiner

W. F. HAMROCK, Assistant Examiner

U.S. Cl. X.R.

260—82.1, 88.2 S, 94.7 A, 94.9 GD, 96 PC